United States Patent [19]

Kotani

[11] Patent Number: 5,189,525
[45] Date of Patent: Feb. 23, 1993

[54] FACSIMILE APPARATUS
[75] Inventor: Takashi Kotani, Tokyo, Japan
[73] Assignee: Canon Kabushiki Kaisha, Tokyo, Japan
[21] Appl. No.: 524,027
[22] Filed: May 15, 1990
[30] Foreign Application Priority Data
  May 17, 1989 [JP] Japan ................................. 1-121453
[51] Int. Cl.⁵ ............................................. H04N 1/00
[52] U.S. Cl. ................................ 358/407; 370/110.1; 358/434
[58] Field of Search .............. 358/400, 401, 402, 403, 358/404, 405, 406, 407, 408, 409, 434, 442; 379/100; 370/110.1, 94.1

[56] References Cited
U.S. PATENT DOCUMENTS

| 4,755,992 | 7/1988 | Albal ........................... 370/110.1 |
| 4,884,269 | 11/1989 | Duncanson et al. ............. 370/110.1 |
| 4,961,185 | 10/1990 | Sawada ......................... 370/110.1 |
| 4,974,097 | 11/1990 | Kaneko et al. .................. 358/400 |
| 4,995,073 | 2/1991 | Okata ............................ 379/94 |
| 4,999,836 | 3/1991 | Fujiwara ....................... 370/110.1 |
| 5,014,300 | 5/1991 | Horvath ........................ 358/440 |
| 5,023,868 | 6/1991 | Davidson et al. ............... 370/110.1 |
| 5,050,005 | 9/1991 | Kogami ........................ 370/110.1 |

FOREIGN PATENT DOCUMENTS

| 0208852 | 1/1987 | European Pat. Off. . |
| 0291307A2 | 5/1988 | European Pat. Off. . |
| 0337610 | 10/1989 | European Pat. Off. . |
| 0357427 | 3/1990 | European Pat. Off. . |
| 3721047A1 | 6/1987 | Fed. Rep. of Germany . |
| 62-274866 | 11/1987 | Japan . |
| 63-133753A | 6/1988 | Japan . |
| 63-148750 | 6/1988 | Japan . |
| 63-283351 | 11/1988 | Japan . |
| 283351 | 11/1988 | Japan . |
| 106540 | 4/1989 | Japan . |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A facsimile apparatus is connected to an ISDN and is capable of transmission/reception. When a facsimile signal received from the ISDN is one sent to a non-ISDN facsimile apparatus, the facsimile signal received from the ISDN is converted into a non-ISDN facsimile signal and this signal is capable of being transmitted to the non-ISDN facsimile apparatus. Further, the facsimile apparatus is capable of being connected to a plurality of facsimile apparatus via an exchange, and a signal can be transmitted to a facsimile apparatus among the plurality thereof that is designated by a subaddress received from the ISDN. The facsimile apparatus is such that at the time of communication with a non-ISDN facsimile apparatus, communication is performed using the D channel of the ISDN, thereby raising the efficiency of ISDN utilization.

14 Claims, 7 Drawing Sheets

FACSIMILE APPARATUS

BACKGROUND OF THE INVENTION

1. Field of the Invention

This invention relates to a facsimile apparatus connected to an ISDN (an integrated series digital network).

2. Description of the Prior Art

An ISDN makes feasible a communication network employing digital transmission in place of a telephone-oriented communication network based on analog transmission, and it provides multifarious communication services such as telephone and facsimile communication and data communication services. The ISDN interface specifications are stipulated by an I-series advisory of the CCITT.

Services provided by a low-level function of an ISDN include services referred to as a "bearer services" defined by CCITT advisory 1.211. Among these, a 3.1 KHz audio service is used in data signal transmission of the 3.1 KHz band such as that of a G3 facsimile. A 64 KHz unlimited digital service is used in digital signal transmission such as that of a G4 facsimile.

Figure 6:
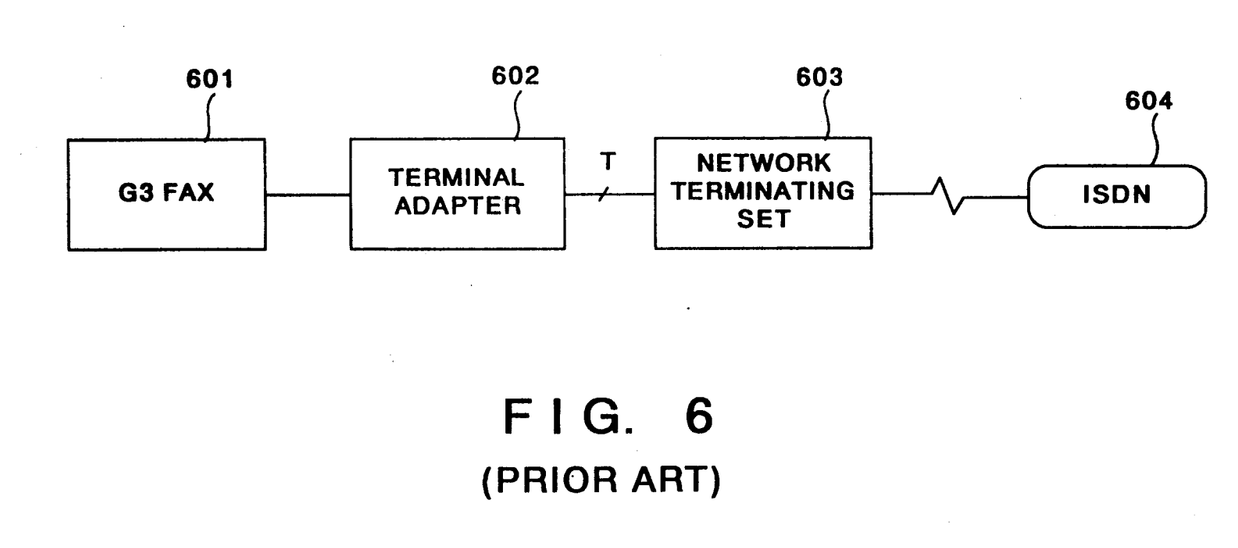
FIG. 6 is a diagram showing the connection between a G3 facsimile apparatus and an ISDN according to the prior art.

FIG. 6 is a block diagram illustrating the manner in which a conventional G3 facsimile apparatus 61 is connected to a network terminating device NT 63 via a terminal adapter 62. Here the G3 facsimile apparatus 61 is connected to the terminal adapter 62 via a line connection terminal, the terminal adapter 62 is connected to the network terminating set NT 63 at a reference point T, and the network terminating set NT 63 is connected to an ISDN 64.

The terminal adapter 62 detects a current loop between itself and the G3 facsimile apparatus 61, identifies an inputted dial signal, subjects a signal received from the facsimile apparatus 61 to an A/D conversion and outputs the converted signal to the ISDN 64 via a B channel. On the other hand, when data is received from the ISDN 64 via the B data channel, the terminal adapter 62 converts this digital data into an analog signal and forms a current loop between itself and the G3 facsimile apparatus 61, and the received facsimile signal is reproduced by the G3 facsimile apparatus 61.

Thus, in the prior art, such a terminal adapter is necessary in order to connect a G3 facsimile apparatus, which is a subscriber's apparatus for non-ISDN use, as a subscriber's apparatus for ISDN. Another problem is that with a basic access interface, a maximum of only eight subscriber's apparatus (e.g., facsimile apparatus) can be connected to one set of wiring.

SUMMARY OF THE INVENTION

The present invention has been devised in view of the prior art described above and its object is to provide a facsimile apparatus in which a non-ISDN facsimile apparatus can be connected to an ISDN without using a terminal adapter.

According to the present invention, the foregoing object is attained by providing a facsimile apparatus connected to an ISDN and capable of transmission and reception, comprising memory means for receiving a facsimile signal from the ISDN and storing the signal as a decoded image signal, and transmission means for converting the image signal into a non-ISDN facsimile signal and transmitting the converted signal to a non-ISDN facsimile apparatus.

Another object of the present invention is to provide a facsimile apparatus in which even a G3 facsimile apparatus can be connected to an ISDN without using a terminal adapter.

According to the present invention, this object is attained by providing a facsimile apparatus connected to an ISDN and capable of transmission and reception, comprising first memory means for receiving a G4 facsimile signal and storing the signal as a decoded image signal, first transmission means for converting the image signal into a G3 facsimile signal and transmitting the converted signal to a G3 facsimile apparatus, second memory means for receiving a facsimile signal from a G3 facsimile apparatus and storing the signal as a decoded image signal, and second transmission means for converting the image signal stored in the second memory means into a G4 facsimile signal and transmitting this G4 facsimile signal to an ISDN G4 facsimile apparatus connected to the ISDN.

A further object of the present invention is to provide a facsimile apparatus in which a greater number (eight or more) of the apparatus can be connected as ISDN subscriber's apparatus.

Still another object of the present invention is to provide a facsimile apparatus so adapted that a transfer can be made to a facsimile apparatus, which is the destination of a transfer, designated from among a plurality of connected facsimile apparatus by a subaddress.

According to the present invention, the foregoing objects are attained by providing a facsimile apparatus connected to an ISDN and capable of transmission and reception, comprising memory means for receiving an ISDN facsimile signal from the ISDN and storing the signal as a decoded image signal, transceiving means capable of transmission/reception with a plurality of facsimile apparatus via an exchange to which the plurality of facsimile apparatus are connected, discriminating means for discriminating whether any of the facsimile apparatus has been designated by a subaddress contained in the ISDN facsimile signal from the ISDN, and transfer means for transferring the image signal to the facsimile apparatus, which has been designated by the subaddress, when designation of the transfer has been discriminated by the discriminating means.

Further, another object of the present invention is to provide a facsimile apparatus in which a facsimile signal from a non-ISDN facsimile apparatus having a low transceiving rate is transmitted through a D channel of an ISDN by a facsimile apparatus in accordance with ISDN specifications so that the facsimile signal can be transmitted and received using an ISDN line efficiently.

According to the invention, the above object is attained by providing a facsimile apparatus connected to an ISDN and capable of transmission/reception with a non-ISDN facsimile apparatus connected thereto, comprising first transceiving means capable of transmission/reception with the ISDN in accordance with specifications conformable to the ISDN, second transceiving means capable of transmission/reception with the non-ISDN facsimile apparatus in accordance with non-ISDN specifications, and communication means for selecting the D channel of the ISDN and transmitting a facsimile signal from the non-ISDN facsimile apparatus to the ISDN upon receipt of the signal by the second transceiving means.

Yet another object of the present invention is to provide a facsimile apparatus in which a G4 facsimile signal is transmitted through a B channel and a G3 facsimile signal is transmitted through a D channel of an ISDN, thereby enabling transmission using the ISDN efficiently.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
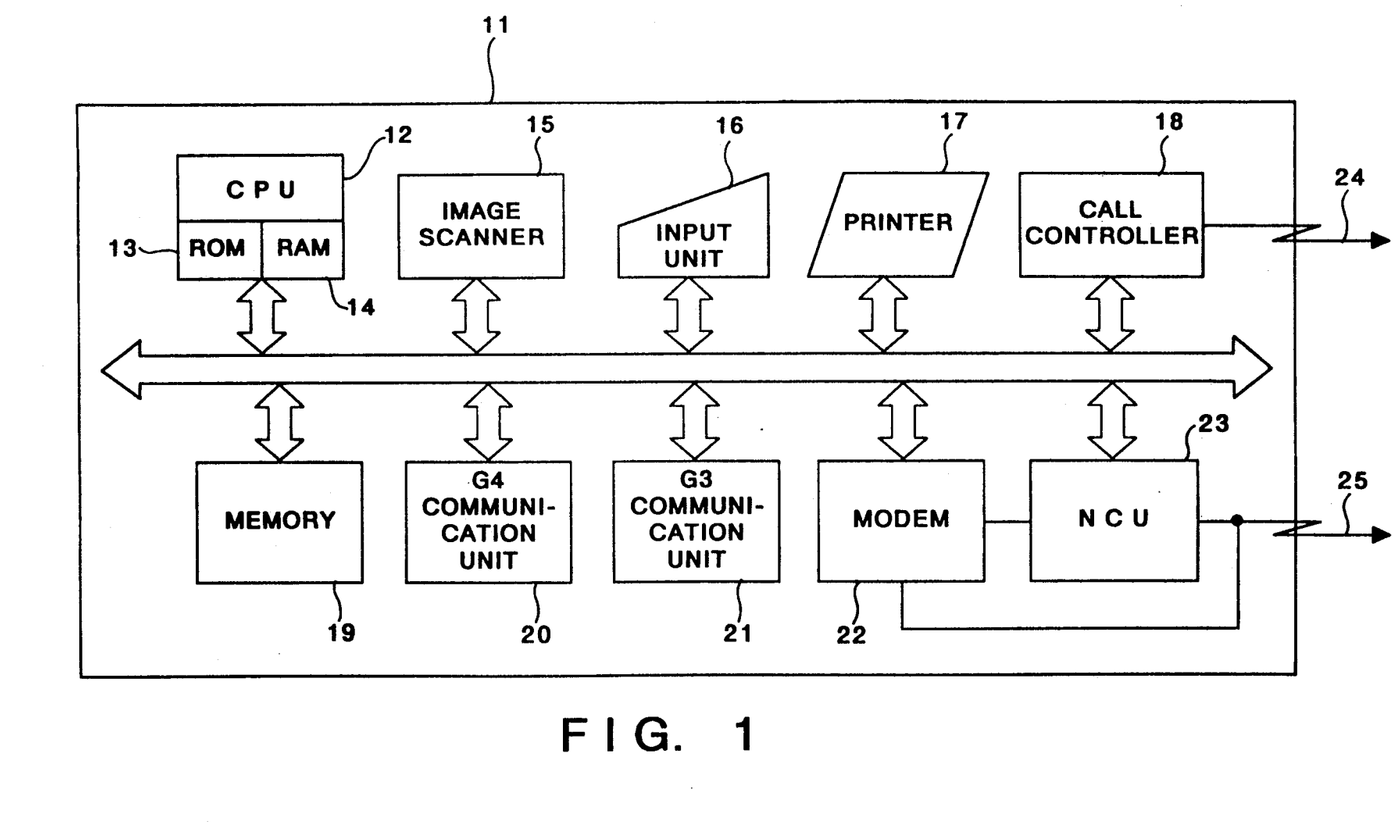
FIG. 1 is a block diagram illustrating the general construction of a facsimile apparatus according to a first embodiment of the present invention.

Description of the facsimile apparatus (FIG. 1)

FIG. 1 is a block diagram illustrating the general construction of a facsimile apparatus according to a first embodiment of the present invention.

As shown in FIG. 1, a facsimile apparatus capable of transmission/reception in accordance with either G3 or G4 specifications includes a CPU 12 for controlling the facsimile apparatus 11 nd having a ROM 13 which stores a program, illustrated by the flowchart of FIG. 3, for controlling the CPU 12, as well as various data, and a RAM 14 used as the working area of the CPU 12. Also included in the facsimile apparatus are an image scanner 15 for photoelectrically reading a document image and outputting the same as a digital signal, an input unit 16 manipulated by the operator for entering the telephone number of a transmission destination, the address of a facsimile apparatus a the destination, etc, and a printing unit 17 for performing printing on a recording paper, which serves as a printing medium, based on a received image or an image signal read by the image scanning unit 15.

The facsimile apparatus 11 further includes a call controller 18, which is connected to an external bus 24, for being connected with an ISDN to perform communication, an NCU (network control unit) 23 connected with a private branch exchange PBX by an analog line 25 to control outgoing and incoming calls, a modulator/demodulator (modem) 22 used at the time of a G3 transmission procedure, a G3 communication unit 21 for decoding an image signal, which is received via the NCU 23 and modem 22, and storing the decoded signal in a memory 19, and also for subjecting image data stored in the memory 19 to an MH conversion and transmitting the data to a G3 facsimile apparatus, which is connected to the private branch exchange PBX, in accordance with a G3 control procedure, and a G4 communication unit 20 for executing a control procedure for communication with a G4 facsimile apparatus connected to the ISDN, decoding image data received from the ISDN and storing the image data in the memory 19, and also for coding image data stored in the memory 19 into a G4 facsimile signal and transmitting the signal to the ISDN via the call controller 18. The memory 19 accumulates image data received form another party's facsimile apparatus or digital image signals inputted from the image scanner 15.

Figure 2:
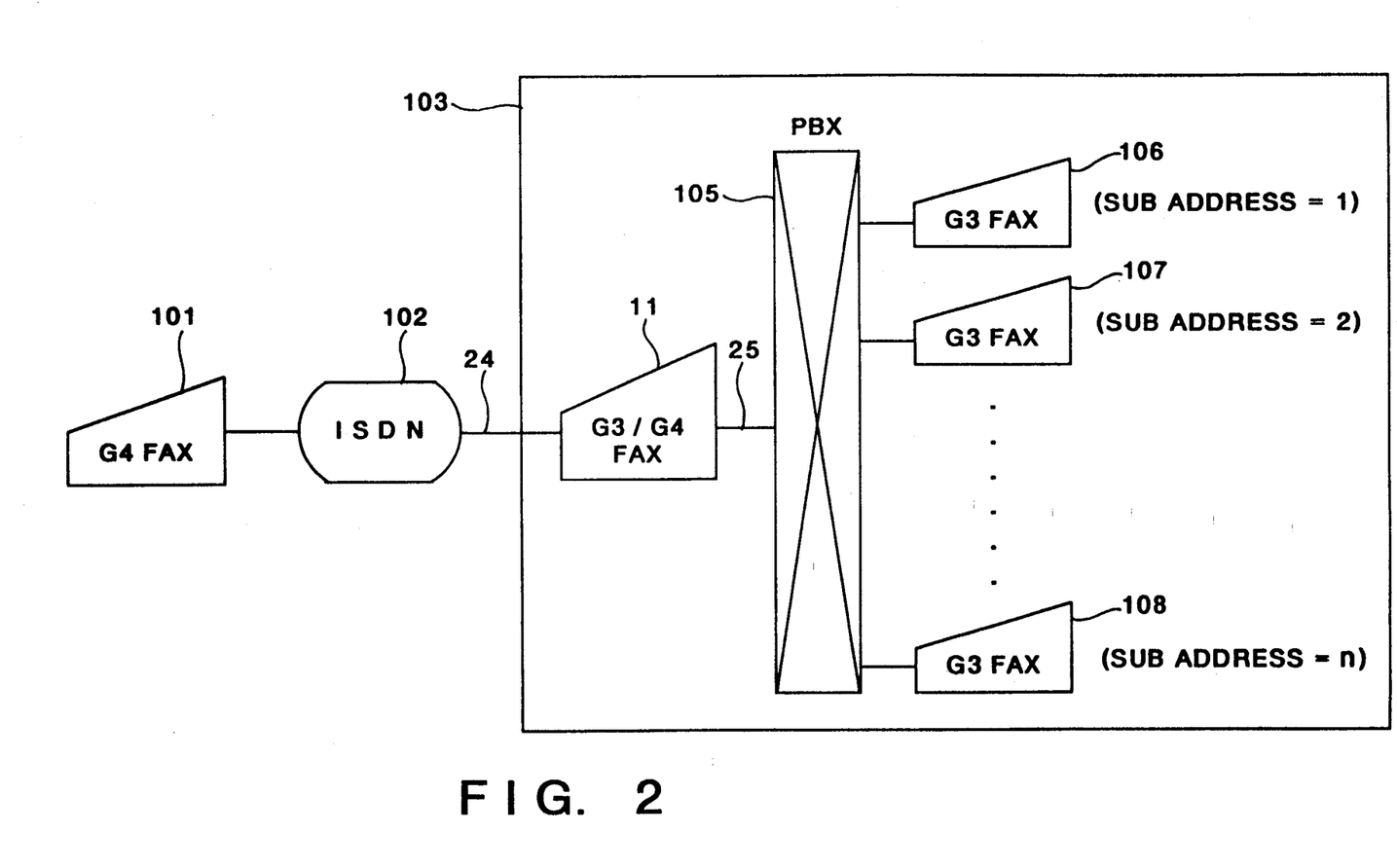
FIG. 2 is a diagram showing an example of a line network of the present embodiment.

FIG. 2 is a diagram showing the connection of the facsimile apparatus 11 of the interposed between the ISDN and the public branch exchange PBX.

As shown in FIG. 2, a G4 facsimile machine 101 is connected to an ISDN 102 and performs transmission/reception with the facsimile apparatus 11 of the embodiment through the ISDN 102. Numeral 103 denotes a building in which a G4 facsimile signal received by the facsimile apparatus 11 is converted into a G3 facsimile signal and outputted to the analog line 25 by the facsimile apparatus 11. Numeral 105 denotes a public branch exchange, and numerals 106–108 designate G3 facsimile apparatus connected to the public branch exchange PBX 105. A maximum of n facsimile apparatus are connected. The value of n is unrelated to the maximum number (=8) of terminal devices connectable to the ISDN; it may be any number so long as this number of apparatus are connectable to the PBX 105. It will be assumed that these G3 facsimile apparatus are those specified for reception by subaddresses in a layer 3 protocol.

Description of operation (FIGS. 1 and 3)

Figure 3A:
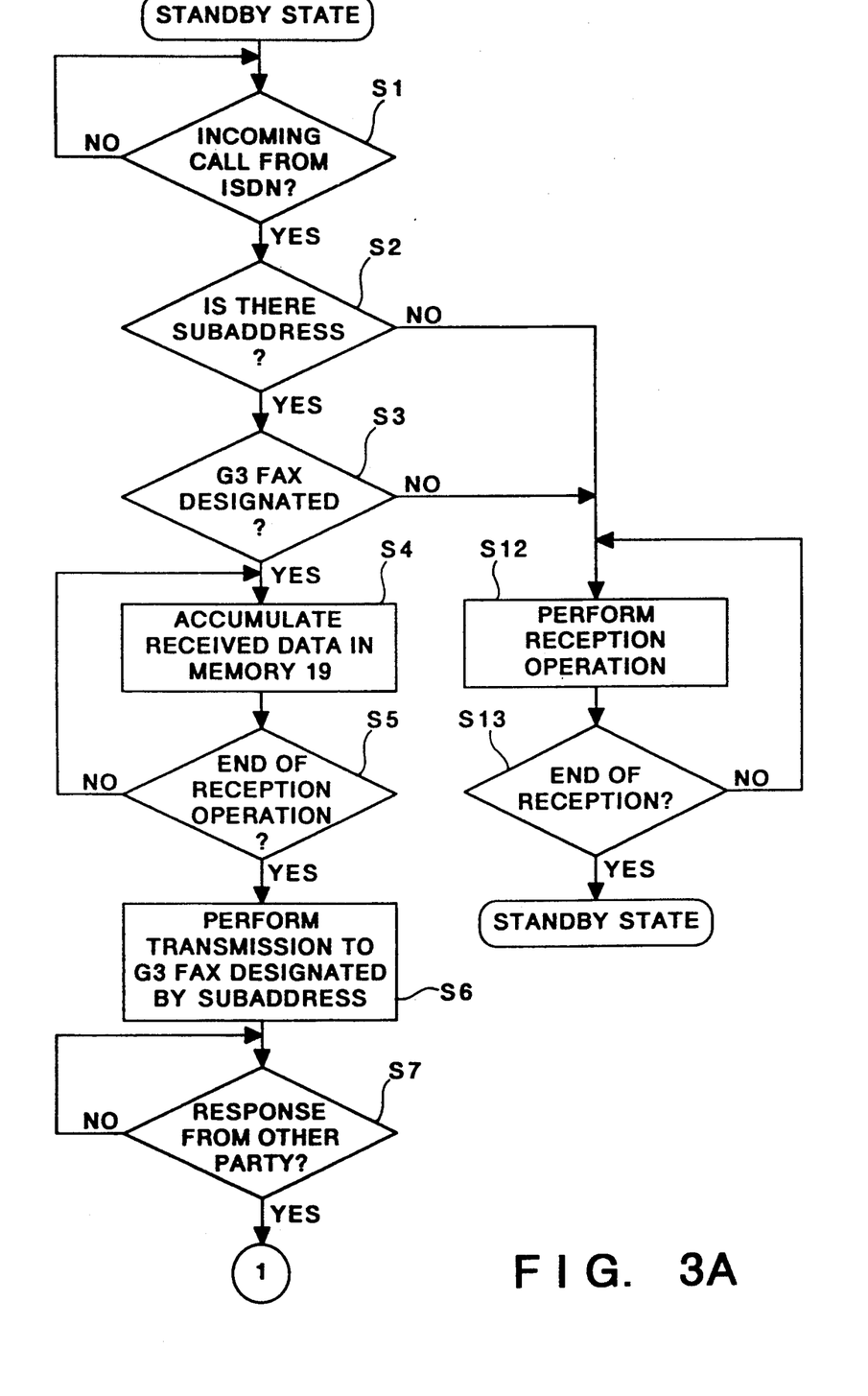
FIGS. 3A and 3B are flowcharts illustrating reception processing according to the first embodiment.
Figure 3B:
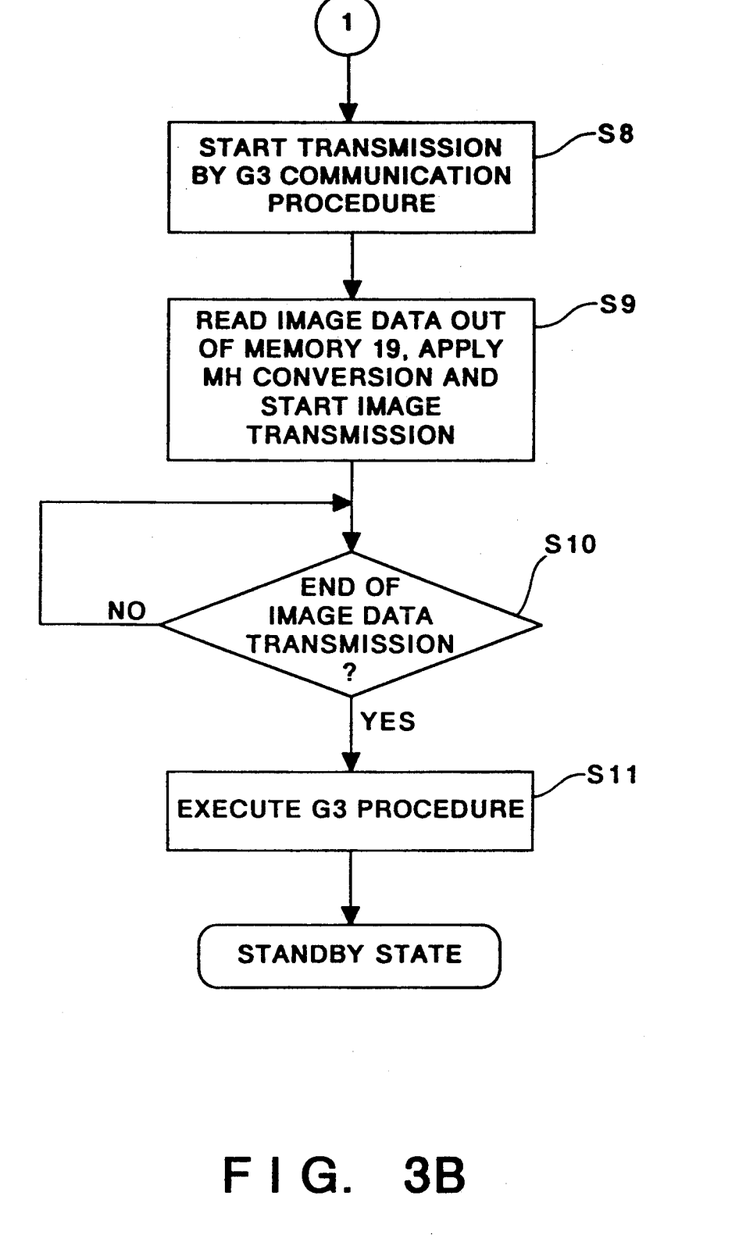

FIGS. 3A and 3B are flowcharts showing processing for receiving image data from the ISDN 102 and transferring the image data to the PBX 105 in the facsimile apparatus of the present embodiment.

First, at step S1, when the call controller 18 informs of the fact that a call has been received from the ISDN 102, the program proceeds to step S2, where it is determined whether there is a subaddress in the incoming information. If there is a call address, the program proceeds to step S3, at which it is determined whether the subaddress is the address of a G3 facsimile apparatus connected to the public branch exchange PBX 105. When the subaddress is the address of a G3 facsimile apparatus, the program proceeds to step S4, at which the received image data are successively decoded and stored in the memory 19 by the G4 communication unit 20. When the reception operation is found to end at step S5 and the image data have been stored in the memory 19, the program proceeds to step S6.

At step S6 an outgoing call is placed to the G3 facsimile apparatus, designated by the subaddress, which is the destination of the data transfer, and it is determined at step S7 whether there is a response from the other party's G3 facsimile apparatus. If there is a response, transmission is started at step S8 by a G3 communication procedure. The program then proceeds to step S9, at which the image data are read out of the memory 19, MH. coded for G3 by the G3 communication unit 21 and then transmitted to any of the G3 facsimile apparatus 106-108, designated by the subaddress, in accordance with the G3 communication control procedure. When transmission is thus completed at step S10, the program proceeds to step S11. Here a G3 transmission ending procedure is executed, after which the system makes a transition to a standby state.

If no subaddress is found at step S2, or if none of the G3 facsimile apparatus are designated at step S3, the program proceeds to step S12. Here an image signal is received and decoded by the G4 communication unit 20 as a G4 facsimile signal, and the image is recorded on the recording paper by the printing unit 17. When reception processing is thus ended at step S13, the system again makes a transition to the standby state.

Thus, in accordance with the first embodiment as described above, a plurality of G3 facsimile apparatus can be connected to an ISDN without using a terminal adapter.

In addition, if, in a case where a call is placed from an ISDN to a G3 facsimile apparatus connected to the ISDN, an address which is the destination of an image data transfer is designated by a subaddress, the image data can be transferred, by a G3 procedure, to the facsimile apparatus which is the destination of the transfer.

Figure 4:
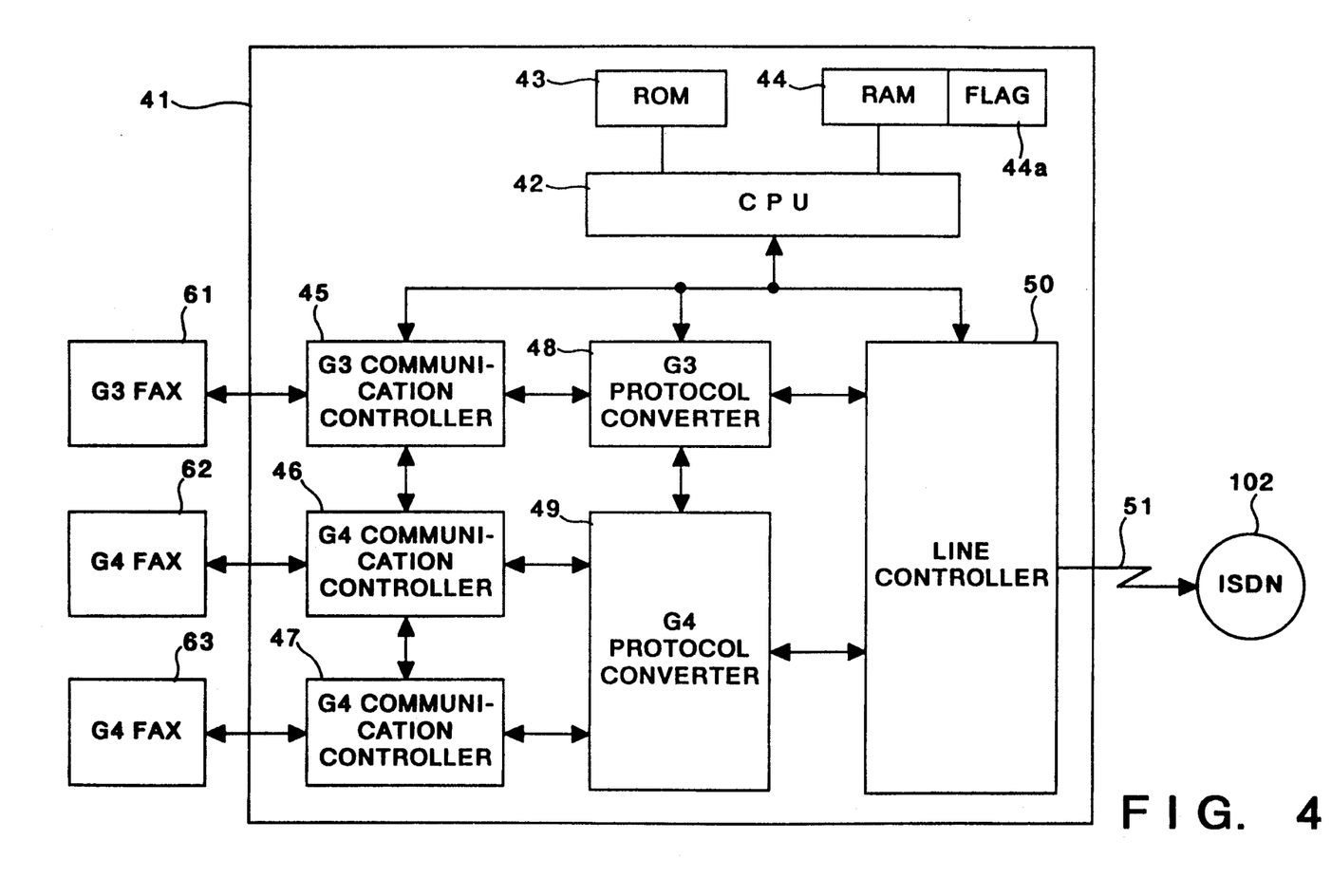
FIG. 4 is a block diagram illustrating the general construction of a facsimile apparatus according to another embodiment of the present invention.
Figure 5:
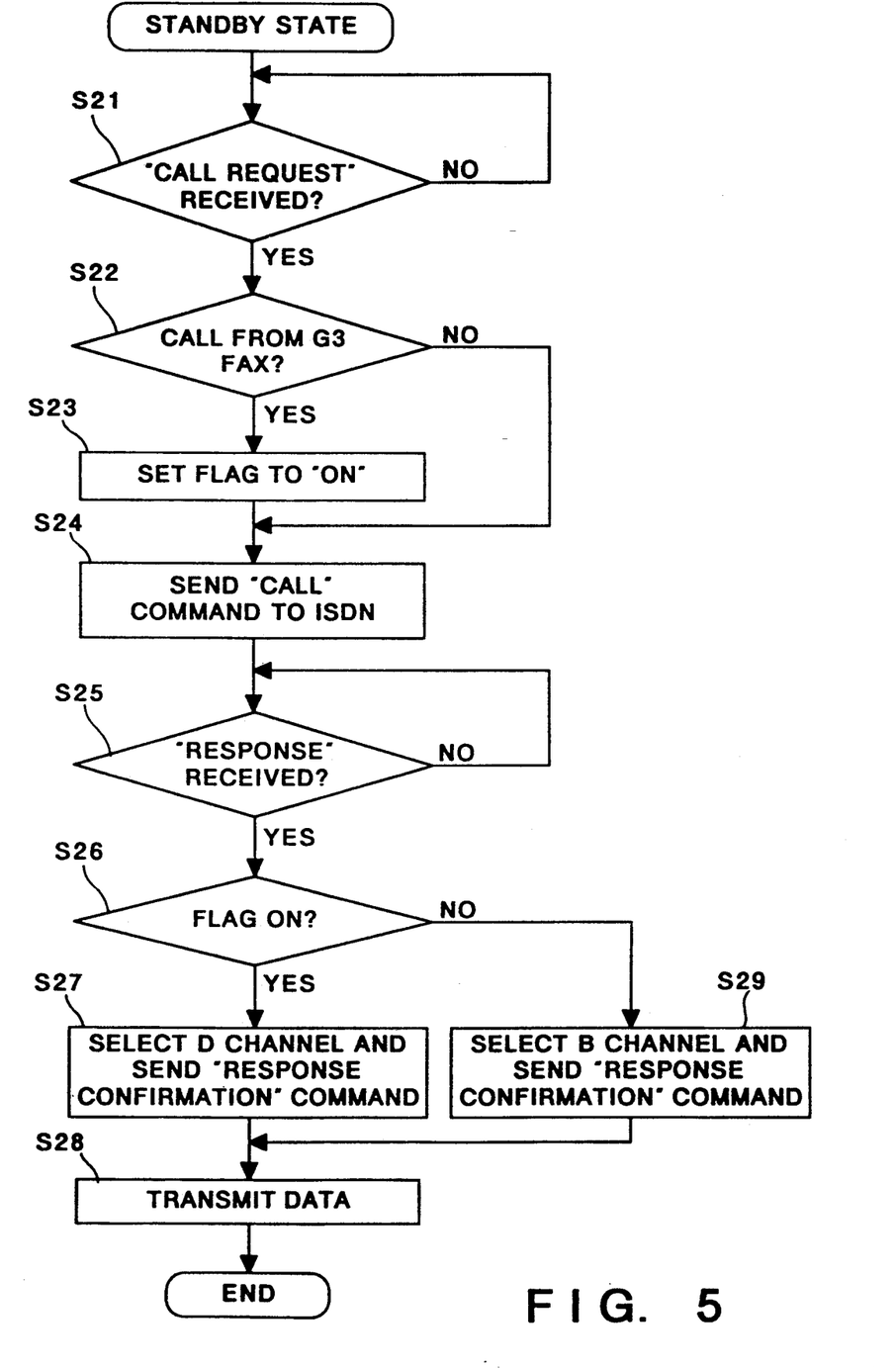
FIG. 5 is a flowchart illustrating transmission processing according to a second embodiment.

Description of the second embodiment (FIGS. 4 and 5)

FIG. 4 is a block diagram showing the general construction of a facsimile apparatus 41 according to a second embodiment of the invention. In the prior art, facsimile signals are transmitted and received over a B channel of an ISDN at all times. With the facsimile apparatus 41 of this embodiment, however, a G3 facsimile signal can be transmitted using the D channel of an ISDN in a case of transmission/reception of a G3 facsimile signal whose communication rate is low.

In FIG. 4, numeral 41 denotes the facsimile apparatus of the second embodiment. Numeral 61 denotes a G3 facsimile apparatus connected to the facsimile apparatus 41, and numerals 62, 63 designate G4 facsimile apparatus. The facsimile apparatus 41 includes a CPU 42 for controlling the overall apparatus in accordance with a control program, which is stored in a ROM 43 and illustrated by the flowchart of FIG. 5), as well as various data. Numeral 44 denotes a RAM used as the working area of the CPU 42.

A G3 communication controller 45, which is for effecting a connection with the G3 facsimile apparatus 61, possesses a function equivalent to the functions of the G3 communication unit 21, modem 22 and NCU 23 of FIG. 1, described above. G4 communication controllers 46, 47 each possess a function identical with that of the G4 communication controller 20 of FIG. 1, described above. These communication controllers 46, 47 are connected to corresponding ones of the G4 facsimile apparatus 62, 63 a control transmission/reception in accordance with G4 specifications. Numeral 48 denotes a G3 protocol converter, and 49 a G4 protocol converter.

In a case where a transmission is made to the ISDN 102 from the G2 facsimile apparatus 61, the facsimile signal from the G3 facsimile apparatus 61 enters the G3 communication controller 45, the signal is converted into a signal corresponding to the D channel of the ISDN by the G3 protocol converter 48, and the converted signal is transmitted to the ISDN 102 through a line controller 50. In a case where a transmission is made to the ISDN 102 from each of the G4 facsimile apparatus 62, 63, the G4 communication controllers 46, 47 receive the facsimile signals from the respective G4 facsimile apparatus 62, 63 and output the signals to the G4 protocol converter 49. The latter subjects these signals to a protocol conversion and outputs the result to the ISDN 102 through the line controller 50.

Description of operation (FIGS. 4 and 5)

FIG. 5 is a flowchart illustrating the operation of the facsimile apparatus 41 according to the second embodiment. The control program for executing this processing is stored in the ROM 43.

It is determined at step S21 whether a "call request" has been received from the G3 facsimile apparatus 61 or the G4 facsimile apparatus 62, 63 connected to the apparatus 41. If a call request has been received, then the program proceeds to step S22, at which it is determined whether there is a call request from the G3 facsimile apparatus 61. When there is a call request from the G3 facsimile apparatus 61, the program proceeds to step S23, at which a flag 44a in the RAM 44 is turned on. Next, at step S24, the line controller 50 is actuated and a call command is sent to the ISDN 102. The system waits for entry of a "response" command from the ISDN 102 at step S25. When the response command is received, the program proceeds to a step S26.

It is determined at step S26 whether the flag 44a of RAM 44 is on, namely whether there is a transmission request from the G3 facsimile apparatus 61. When there is a transmission request from the G3 facsimile apparatus 61, the program proceeds to a step S27, at which the G3 protocol converter 48 and line controller 50 are so instructed as to carry out transmission upon selecting the D channel of the ISDN 102.

On the other hand, when there is a transmission request from the G4 facsimile apparatus 62 or 63, the program proceeds to step S29, at which the G4 protocol converter 49 and line controller 50 are so instructed as to carry out transmission upon selecting the B channel of the ISDN 102. Thus, the program proceeds to step S28, at which data are transmitted to the ISDN 102. Processing is then terminated.

Thus, in accordance with the second embodiment as described above, the D channel of the ISDN 102 is selected and the transmission is made when communication is carried out by a G3 facsimile apparatus connected to the facsimile apparatus of this embodiment.

When a transmission request is received from a G4 facsimile apparatus, on the other hand, communication is performed by the B channel of the ISDN, whereby each channel of the ISDN can be utilized effectively.

In accordance with the foregoing embodiment, a non-ISDN facsimile apparatus is adopted as the G3 facsimile apparatus. However, the invention is not limited to this arrangement but can be applied also to a facsimile apparatus, such as a G2 facsimile apparatus, having a transmission rate slower than that of a G4 facsimile apparatus.

In addition, though a G4 facsimile apparatus has been described as an example of a facsimile apparatus conforming to ISDN specifications, the invention is not limited to this arrangement and other specifications can be applied.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus connected to a digital network of an ISDN and an analog network other than ISDN, comprising detecting means for detecting arrival information from said digital network;

receiving means for receiving a digital facsimile signal from said digital network;

transmission means for converting the digital facsimile signal into an analog facsimile signal and transmitting the analog facsimile signal to said analog network;

output means for outputting the digital facsimile signal; and control means for discriminating whether or not said arrival information includes address information to designate a destination thermal and for discriminating whether or not said address information designates an analog terminal connected to said analog network, where said arrival information includes the address information to designate an analog terminal, for causing said transmission means to transmit an analog facsimile signal corresponding to said digital facsimile signal received form said digital network to the analog terminal designated by said address information, wherein when said arrival information does not include the address information, said control means causes said output means to output said digital facsimile signal from the digital network.

2. The facsimile apparatus according to claim 1, wherein said receiving means receives the digital facsimile signal in accordance with a predetermined communication protocol and decodes the digital facsimile signal; and the facsimile apparatus further comprises:
memory means for storing the signal decoded by said receiving means.

3. The facsimile apparatus according to claim 2, wherein said transmission means encodes the signal stored in said memory means and converts the encoded signal into an analog facsimile signal.

4. The facsimile apparatus according to claim 2, wherein said receiving means receives the digital facsimile signal in accordance with a group 4 facsimile protocol.

5. The facsimile apparatus according to claim 3, wherein said transmitting means transmits the analog facsimile signal to the analog network in accordance with a group 3 facsimile protocol.

6. A facsimile apparatus connected to both a digital network of an ISDN and an analog network, comprising:

detecting means for detecting arrival information from the digital network;

receiving processing mean so receiving a digital facsimile signal from said digital network and decoding the digital facsimile signal;

recording means for recording the decoded facsimile signal;

memory means for storing the digital facsimile signal decoded by said receive processing means;

transmission means for converting the digital facsimile signal stored in said memory means into an analog signal and transmitting the analog facsimile signal to the analog network; and selecting means for discriminating whether or not said arrival information includes address information to designate a destination thermal and for discriminating whether or not said address information designates an analog terminal connected to said analog network, and according to the discriminating result, for selecting either to have said recording means record the digital facsimile signal or to have said transmission means transmit the analog facsimile signal to the analog network.

7. The facsimile apparatus according to claim 6, wherein said receiving means receives the digital facsimile signal in accordance with a group 4 facsimile protocol.

8. The facsimile apparatus according to claim 6, wherein said transmission means transmits the analog facsimile signal the analog network in accordance with a group 3 facsimile protocol.

9. The facsimile apparatus according to claim 6, wherein said transmitting means transmits the analog facsimile signal corresponding to the digital facsimile signal received form the digital network of ISDN to the analog terminal equipment designated by said address information.

10. A facsimile system connected to a digital network of an ISDN, comprising:

a digital facsimile apparatus a connected to both said digital network of ISDN and an analog network;

a plurality of analog facsimile apparatuses connected to said digital facsimile apparatus via said analog network;

wherein said digital facsimile apparatus comprises;

detecting mean for detecting arrival information from the digital network;

receiving means for receiving a digital facsimile signal from said digital network;

transmission means for converting the digital facsimile signal into an analog facsimile signal and transmitting the analog facsimile signal to said analog network;

output means or outputting the digital facsimile signal; and control means for discriminating whether or not said arrival information includes address information to designate a destination terminal and for discriminating whether or not said address information designates an analog terminal connected to said analog network, and when said arrival information includes address information to designate an analog terminal, for causing said transmission means to transmit the analog facsimile signal corresponding to the digital facsimile signal to the analog terminal equipment designated by said address information;

wherein when said arrival information does not include the address information, said control means causes said output means to output the digital facsimile signal from said digital network.

11. The facsimile system according to claim 10, wherein said receiving means receives the digital facsimile signal in accordance with a predetermined communication protocol and decodes the digital facsimile signal; and the facsimile system further comprises:
memory means or storing the signal decoded by the receiving means.

12. The facsimile system according to claim 11, wherein said transmission means encodes the signal stored in said memory means and converts the encoded signal into the analog facsimile signal.

13. The facsimile system according to claim 11, wherein said receiving means receives the digital facsimile signal in accordance with a group 4 facsimile process.

14. The facsimile system according to claim 12, wherein said transmission means transmits the analog facsimile signal to the analog network in accordance with a group 3 facsimile protocol.

* * * * *

UNITED STATES PATENT AND TRADEMARK OFFICE
CERTIFICATE OF CORRECTION

PATENT NO. : 5,189,525                                    Page 1 of 2

DATED      : February 23, 1993

INVENTOR(S) : TAKASHI KOTANI

It is certified that error appears in the above-identified patent and that said Letters Patent is hereby corrected as shown below:

On the title page: Item

IN [56] REFERENCES CITED

Under U.S. PATENT DOCUMENTS:
    "Horvath" should read --Harvath--.

Under FOREIGN PATENT DOCUMENTS:
    "3721047A1  6/1987  Fed. Rep. of Germany ." should read
    --3721047A1  6/1988  Fed. Rep. of Germany .--.

COLUMN 1

Line 20, "1.211." should read --I.211.--.

COLUMN 6

Line 66, "comprising" should read --comprising:--.

COLUMN 7

Line 11, "thermal" should read --terminal--.
Line 18, "form" should read --from--.
Line 50, "mean so" should read --means for--.
Line 63, "thermal" should read --terminal--.

UNITED STATES PATENT AND TRADEMARK OFFICE
CERTIFICATE OF CORRECTION

PATENT NO. : 5,189,525
DATED : February 23, 1993
INVENTOR(S) : TAKASHI KOTANI

It is certified that error appears in the above-identified patent and that said Letters Patent is hereby corrected as shown below:

COLUMN 8

Line 8, "signal" should read --signal to--.
Line 32, "or" should read --for--.

Signed and Sealed this

Eighth Day of February, 1994

Attest:

BRUCE LEHMAN

*Attesting Officer*      Commissioner of Patents and Trademarks